United States Patent [19]

Abel et al.

[11] Patent Number: 5,609,460

[45] Date of Patent: Mar. 11, 1997

[54] PROCESS FOR TRANSFERRING GOODS LOAD UNITS ON OR FROM A TRAIN

[75] Inventors: Burkhard Abel, Bottrop; Gerhard Birkenfeld, Bochum; Manfred Lücking, Essen; Ulrich P. Vogt, Essen; Dieter Zimek, Essen, all of Germany

[73] Assignee: Krupp Fordertechnik GmbH, Duisburg, Germany

[21] Appl. No.: 403,877

[22] PCT Filed: Sep. 25, 1993

[86] PCT No.: PCT/EP93/02611

§ 371 Date: Mar. 21, 1995

§ 102(e) Date: Mar. 21, 1995

[87] PCT Pub. No.: WO94/07784

PCT Pub. Date: Apr. 14, 1994

[30] Foreign Application Priority Data

Oct. 1, 1992 [DE] Germany ............... 42 33 007.6

[51] Int. Cl.⁶ ..................................... B65G 63/00
[52] U.S. Cl. .................. 414/334; 414/339; 414/342; 414/344; 414/786
[58] Field of Search ............... 414/334–342, 414/344, 389–392, 560–561, 572, 786; 104/18

[56] References Cited

U.S. PATENT DOCUMENTS

| | | | |
|---|---|---|---|
| 3,223,258 | 12/1965 | Ewers | 414/341 |
| 3,977,513 | 8/1976 | Rushforth | 414/339 X |
| 4,005,787 | 2/1977 | Sleep | 414/395 |
| 4,033,403 | 7/1977 | Seaton et al. | 104/18 X |
| 4,093,084 | 6/1978 | Ringer | 414/392 X |
| 4,362,456 | 12/1982 | Barry | 414/334 |
| 4,370,085 | 1/1983 | Barry | 414/337 |
| 4,378,741 | 4/1983 | Nagahori | 414/334 X |
| 4,519,737 | 5/1985 | Barry | 414/337 |
| 4,543,027 | 9/1985 | Jones | 414/400 |
| 4,746,257 | 5/1988 | Barry | 414/337 X |
| 5,161,930 | 11/1992 | Canziani | 414/339 X |
| 5,219,261 | 6/1993 | Barry | 414/334 X |
| 5,421,688 | 6/1995 | Füchtey et al. | 414/344 X |

FOREIGN PATENT DOCUMENTS

| | | |
|---|---|---|
| 1196573 | 3/1966 | Germany . |
| 1556636 | 10/1970 | Germany . |
| 2213252 | 9/1973 | Germany . |
| 2362826 | 6/1974 | Germany . |

(List continued on next page.)

OTHER PUBLICATIONS

Methods of Goods Distribution and Order Filling in the United States (1969); pp. 727 through 732.
dhf deutshce hebe–und fördertechnik, H.1/2, 1992, S. 56–59, 60.

*Primary Examiner*—James W. Keenan
*Attorney, Agent, or Firm*—Herbert Dubno

[57] ABSTRACT

For the transloading of loaded goods units (82), such as containers, interchangeable containers, semi-trailers or the like by means of transloading lifting gear (18) from or onto a slowly travelling train (6) formed by container cars (48), there is initially associated with each container car (48) to be unloaded and/or loaded a reference-point (R) the position of which, is continuously measured in relation to a fixed measuring section (40). Subsequently there is measured, in relation to the fixed measuring section (40)

in the case of a unit (82) to be unloaded, the position, of at least one load attack point (81), and in the case of a unit (82) to be loaded, the position of locating elements (93) of the container car (48). The common center point (85) of the load attack points (81) or of the locating elements (93) in relation to the reference point (R) is computed, the position of the center (86) of the load receiving points of the associated transloading lifting gear (18) is continuously measured in relation to the fixed measuring section (40, 41) and the transloading lifting gear is moved so that its load receiving center (86) coincides with the center (85) of the load attack points (8 1) or the locating elements (93).

3 Claims, 9 Drawing Sheets

FOREIGN PATENT DOCUMENTS

| | | |
|---|---|---|
| 2539968 | 3/1976 | Germany . |
| 2701889 | 7/1977 | Germany . |
| 2622698 | 11/1977 | Germany . |
| 2440682 | 12/1977 | Germany . |
| 2658130 | 7/1978 | Germany . |
| 2823048 | 12/1979 | Germany ............................. 414/342 |
| 3100860A1 | 1/1982 | Germany . |
| 3616484C2 | 12/1989 | Germany . |
| 3907376A1 | 9/1990 | Germany . |
| 4120923A1 | 1/1993 | Germany . |
| WO81/00557 | 5/1981 | WIPO . |
| 3004962 | 3/1993 | WIPO ................................. 414/340 |

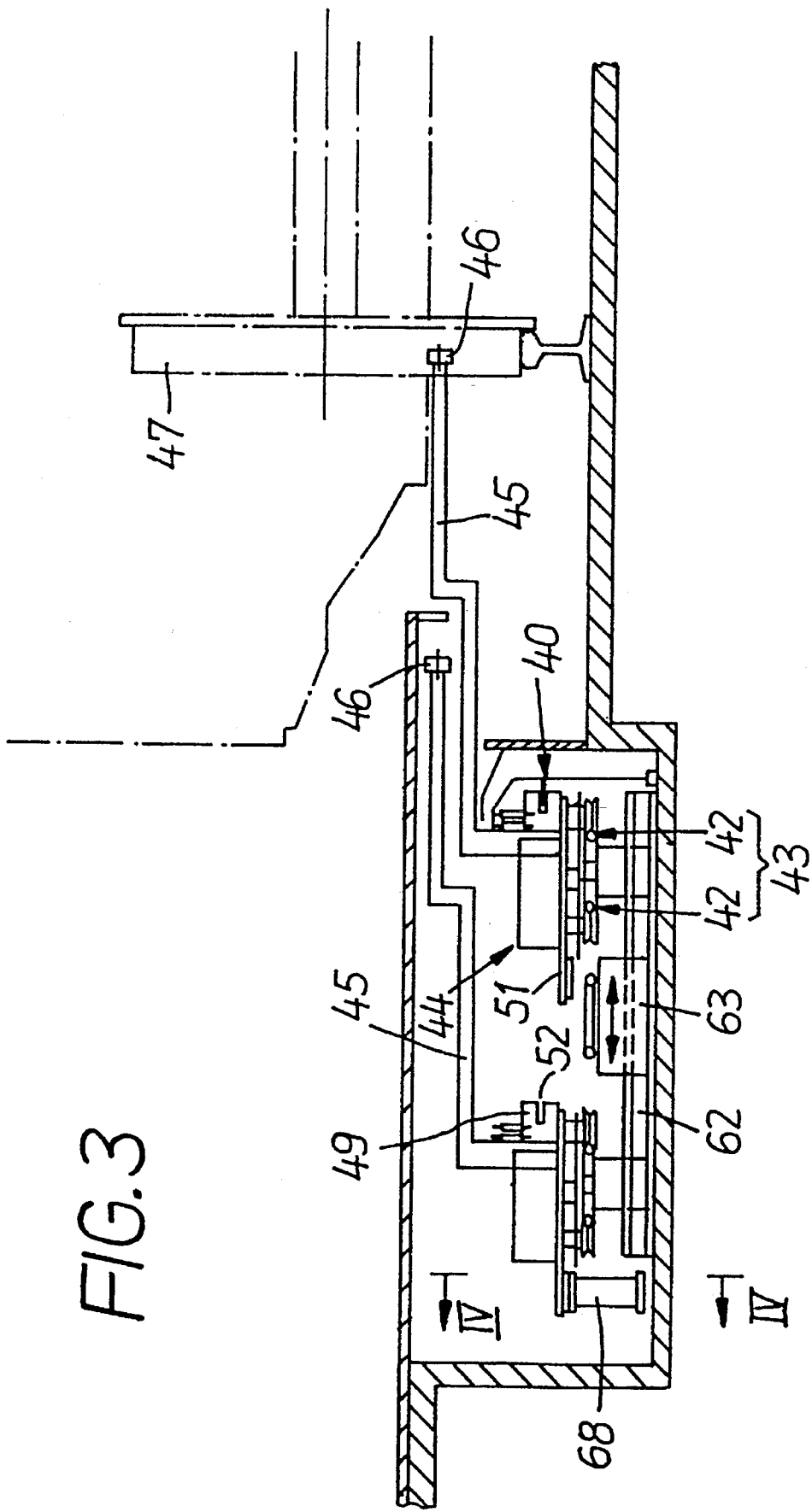

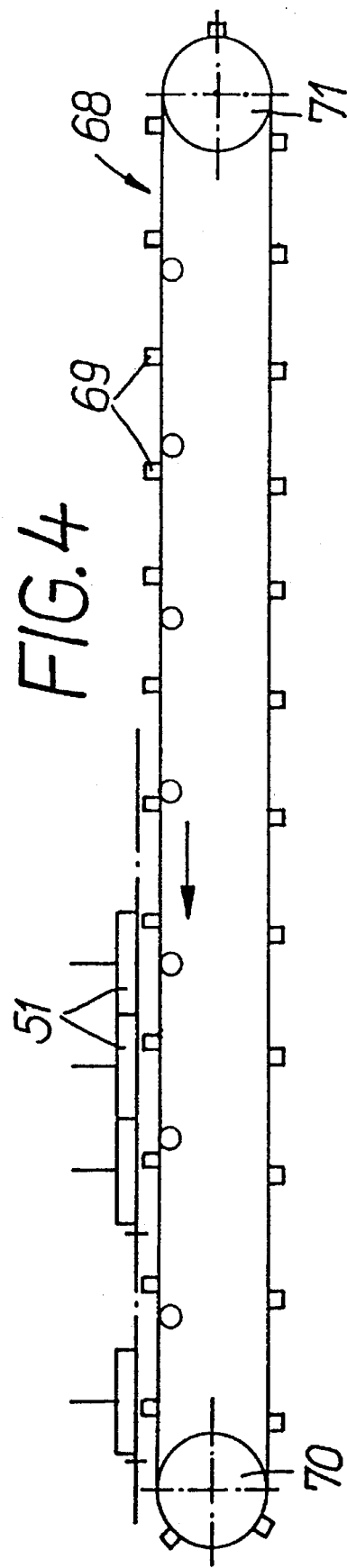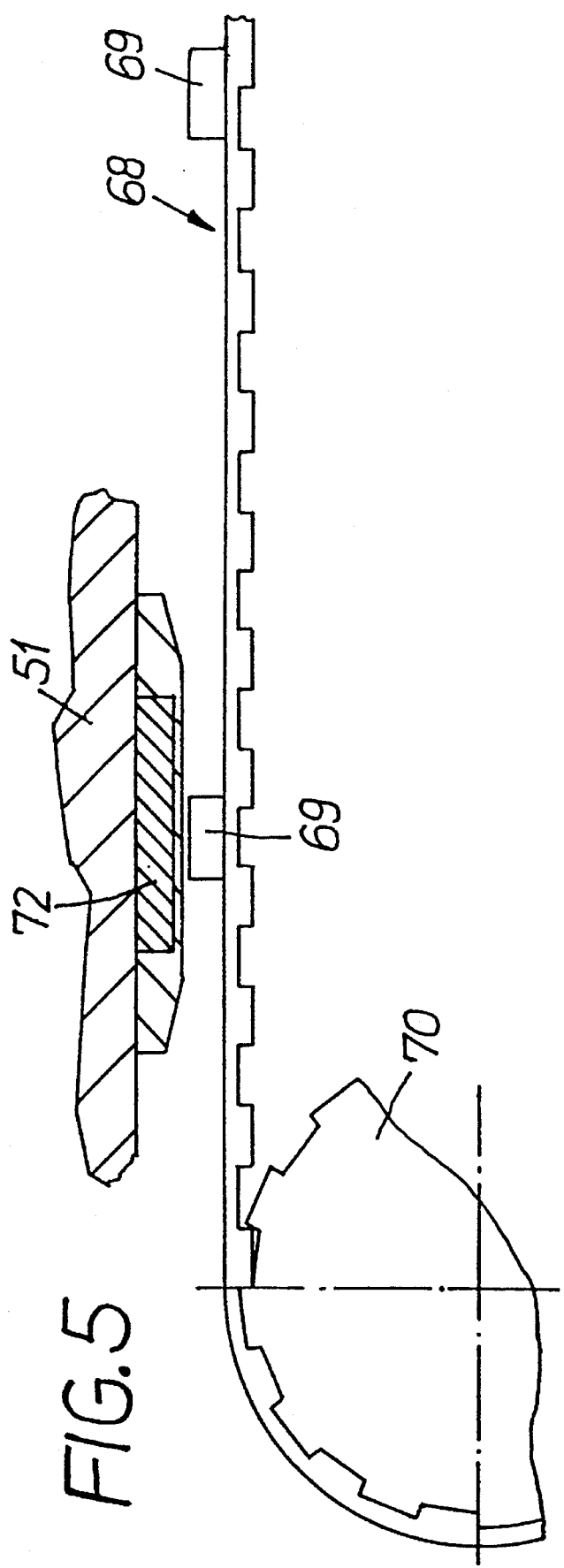

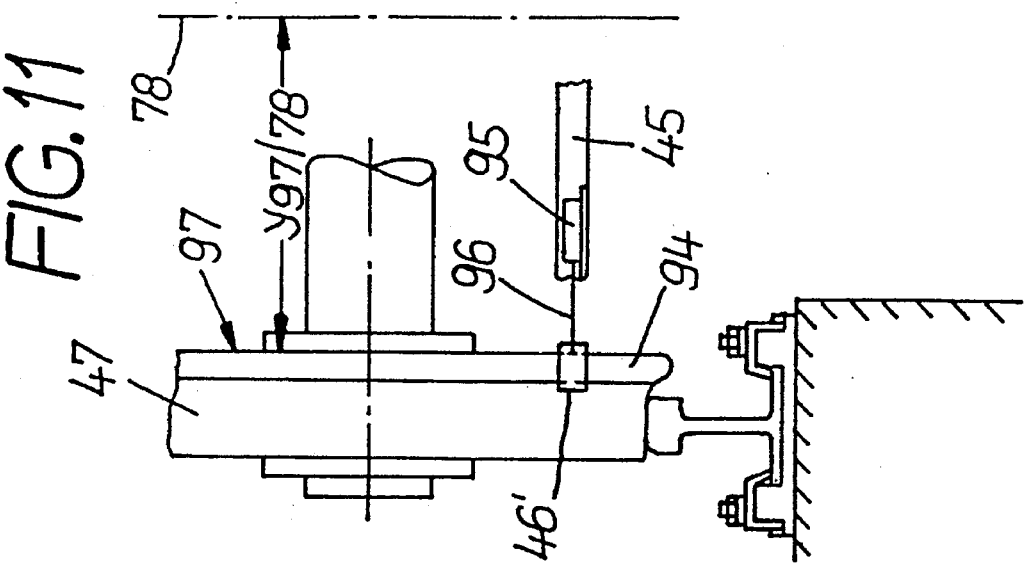
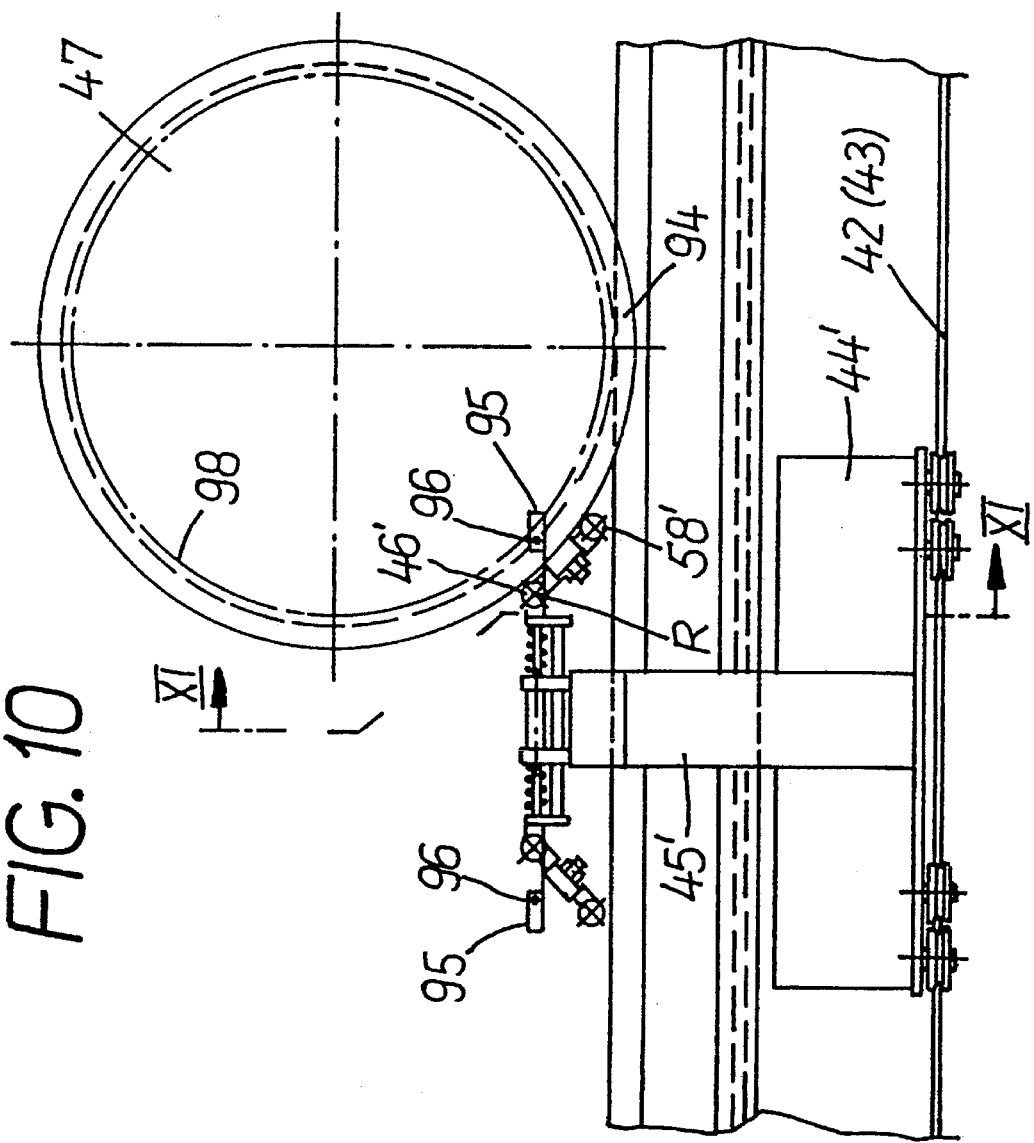

PROCESS FOR TRANSFERRING GOODS LOAD UNITS ON OR FROM A TRAIN

CROSS REFERENCE TO RELATED APPLICATIONS

This application is a national phase of PCT/EP93/02611 file 25 September 1993 and based, in turn, upon German national application P 42 33 007.6 filed 10 October 1992 under the International Convention.

FIELD OF THE INVENTION

The invention relates to a process for the transloading of loaded goods units such as containers, interchangeable containers, semi-trailers or the like by means of transloading lifting gear (so-called rendezvous technology) from or onto a slowly travelling train formed by container cars as well as to a means for carrying out the process, comprising a rail system including at least one track, a store complex comprising a store internal transport system and transloading lifting gear extending to the rail system and the store internal transport system.

A process and a means of the aforesaid type have already been proposed. If a train travels from locality A to locality Z by way of the localities B, C, . . ., it is usual for only part of the loaded goods units to be unloaded at the localities B, C, . . . The loading capacities of the container cars of the train which are already free or are rendered free as aforesaid, may be used to receive other loaded goods units.

When transloading from or onto moving container cars it stands to reason that—even in the event of low (crawling) velocities—considerable problems arise in the reliable picking up or the setting down of the loading units rapidly. If from a section of the train only a small proportion of the loaded goods units is unloaded it is possible, in view of the capacity of the transloading lifting gear, for the train to travel at an appropriate velocity. If, on the other hand, a major proportion of loaded goods units is to be unloaded from the next following train section, the train, because of the available transloading capacity, must be moved correspondingly slowly. Due to the brake applications necessitated thereby and the resultant resiliency effect of the train (sprung traction and pushing means between the individual cars) there result timber uncertainty factors and difficulties when picking up (gripping) the loaded goods units to be unloaded or when putting down the loaded goods units to be loaded onto the train:

A need exists to so improve the process of the aforesaid type and a means for carrying out the process, that the transloading of the loaded goods units can be accelerated and rendered more reliable.

OBJECT OF THE INVENTION

It is, therefore, the object of this invention to provide an improved process for transferring load units to and from a train as well as to provide apparatus for carrying out the improved process.

SUMMARY OF THE INVENTION

The present invention provides a process wherein initially each container car to be unloaded and/or loaded has assigned thereto a reference or measuring point, the position of which, being variable in space in terms of absolute time, is continuously measured in relation to a fixed measuring section, whereafter there is measured in relation to the fixed measuring section, and defined as a differential distance in relation to the reference point:

in the case of a loaded goods unit to be unloaded, the position which, in the rail longitudinal direction, is likewise variable of at least one load attack point or a gripping position of the loaded goods unit, e.g. the corner recesses (corner castings) of containers and in the case of a loaded goods units to be loaded, the position which is variable in time in the longitudinal direction of the rails, of the receiving or locating pins of the container car, whereupon the common centerpoint of the load attack points, or of the locating pins in relation to the reference point is determined, the position of the center of the load receiving points of the associated transloading lifting gear is continuously measured in relation to the fixed measured section, and the transloading lifting gear is moved so that the load receiving center coincides with the center of the load attack points or the receiving elements.

The basic concept of the invention resides in that the position of the load attack points of the loaded goods units which varies with time prior to their being picked up (gripped) respectively of the locating elements of the train prior to the putting down of the loaded goods units, is to be made known at any point in time in relation to an absolute distance measure (measuring section) and independently of the prevailing velocity in order to guide the transloading lifting gear accurately to the required position. By forming a reference point for each container car, the position of the respective container car which changes with time, is known at any instance of measurement. By subsequently measuring the load attack points or the receiving elements in relation to their associated center at any given point in time their relative distance from the simultaneously determined reference point can be computed. Accordingly, each load attack point or each locating element and the associated receiving or setting down center in relation to the absolute distance measure is known at all times. The aforesaid measuring section may in this context stand alone or comprise a plurality of measuring sections calibrated in relation to one another.

In this context the determination of the common center of the load attack points or the locating elements in relation to the reference point may proceed via the measurement of a further load attack point or a further locating element or by way of previously known data of the carrier units.

The effectiveness of the process according to the invention may be further enhanced in that the positions of the load attack points or receiving elements are additionally determined in terms of their components extending horizontally and/or vertically transversely to the longitudinal direction of the rails. Thereby it is possible to perform required lateral and/or angular corrections of the gripping frame of the transloading lifting gear in good time prior to engaging respectively setting down the loaded goods units, thereby accelerating transloading. Since the transverse components, due to the sinusoidal travel of the container car, can change continuously it is advantageous to perform or repeat an appropriate measurement immediately prior to gripping or setting down, i.e. as briefly as is technically feasible prior thereto. Distance sensors suitable therefor may be fitted both to the transloading lifting gear as well as to suitable fixed points.

In order to make possible a smooth automatic operation, provision is made for the previously known data and measured positions of the loaded goods units, of the container wagons and of the transloading lifting gear to be fed into a computer and to transmit the data determined thereby from there to the transloading lifting gear.

The aforementioned means for carrying out the process comprises the feature that the rail track has assigned thereto at least one unloading section and one loading section, that parallel to the rail track a measuring section is provided associated with measuring units for forming the reference point, adapted to be moved along by the container cars, that—viewed in the direction of movement of the train—in advance of each loading or unloading section a measuring means is provided which is suitable to detect the position, variable with time, of the load attack points of the loaded goods unit or the locating elements of the container car, in relation to the measuring section and that the transloading lifting gear is connected by way of a further measuring means to a further measuring section associated with the first mentioned measuring section.

For different loaded goods units it is necessary to provide on the wagons different locating elements, e.g. locating pins. In order to be able to locate and control reliably the locating elements of the slowly travelling train in the event of any change in type of the loaded goods units (in the simplest case a change in length of a container) provision is made for providing between the loading and unloading sections a retooling section.

For the formation of the reference point the measuring units associated with the measuring section preferably comprise a component adapted to be brought into engagement with the respective container wagon, which in a preferred embodiment takes the form of a jib on the end of which a roll may be fitted.

In order to reduce the pressure spikes arising on contact between the jib and the container wagon, provision is made for the roll to be fitted to the jib by way of a shock absorber with restoration means, such that the restoration means moves the roll into a set point or reference position in relation to the jib.

In order to prevent the dog member of the measuring means from becoming disengaged in the event of a sudden deceleration of the container wagon, provision is made for this to be associated with a magnet, the latter, in a preferred embodiment being fitted to a pivotable lever which in turn is adapted to bear, by means of a further roll, against the container car or a wheel of the latter. The pivotability permits an adaptation of the position of the magnet to wheels of different diameters, the further roll serving to maintain the required spacing between the magnet and the wheel of the container car.

In order, even in the transverse direction (y-direction), to obtain a reliable signal concerning the prevailing co-ordinates of the load attack points of the loaded goods units respectively the locating points of the container car, the measuring units, in an advantageous further development of the invention, are equipped with a transversely arranged distance measuring device directed at a region of the container car or transport wagon, preferably the inner periphery of the wheel.

In order to be able to fit the measuring units to the container cars in both directions of movement it is provided for their dog units, including the roll and pivotable jib with the magnet and further roll, to be designed symmetrically to the jib.

In order to provide the measuring units with the required restoration it is furthermore provided that at both ends of the measuring section a means is provided suitable for retracting the measuring units out of the measuring section, or to move them into such measuring section.

The return of the measuring unit preferably proceeds by a transport track provided parallel to the measuring section, associated with a drive means, preferably taking the form of an endless belt, equipped with dog elements for the measuring units.

The endless belt is preferably made of non-magnetizable material and the dog elements are made of magnetizable material, whereas the measuring units comprise magnets within the trajectory of the dog elements.

In order to utilize the space adjoining the track for different purposes it may be advantageous to accommodate the measuring section including the measuring units and their transport system (guide means, replacement means and drive means for return conveyance) between the mils of the track or within the track.

The measuring means for determining the position of the point of attack of the loaded goods units or the locating elements of the container wagons, preferably take the form of a laser distance sensor which is pivotal about a stationary vertical and a horizontal axis and includes integrated angle sensors. For a given fixed position, measured distance and measured angles (in horizontal and vertical direction) it is always possible to determine the corresponding Cartesian co-ordinates in the longitudinal direction of the mils and transversely thereto.

In order to accelerate the transloading of the loaded goods units the measuring units, the measuring means and the controls of the traveling drive means of the lifting gear means are connected to a centralized computer.

In order to be able to perform the setting down of the loaded goods units at the store with a minimum of problems, the store internal transport system comprises at least one transverse conveyor including panel-shaped transport units which at least temporarily occupy a defined position.

BRIEF DESCRIPTION OF THE DRAWING

The above and other objects, features, and advantages will become more readily apparent from the following description, reference being made to the accompanying drawing in which:

FIG. 3 shows the measuring units associated with the measuring section in a cross-sectional view along the line III—III in FIG. 2;

FIG. 4 shows the return belt associated with the measuring unit in a view which is partly sectionalised along the line IV—IV in FIG. 3;

FIG. 5 shows a detailed view of the return belt in an enlarged representation;

FIG. 10 shows a measuring carriage engaging the wheel flange of a vehicle wheel and having in addition a transverse measuring device; and FIG. 11 shows the construction in a cross-section along the line XI—XI in FIG. 10.

SPECIFIC DESCRIPTION

Figure 1:
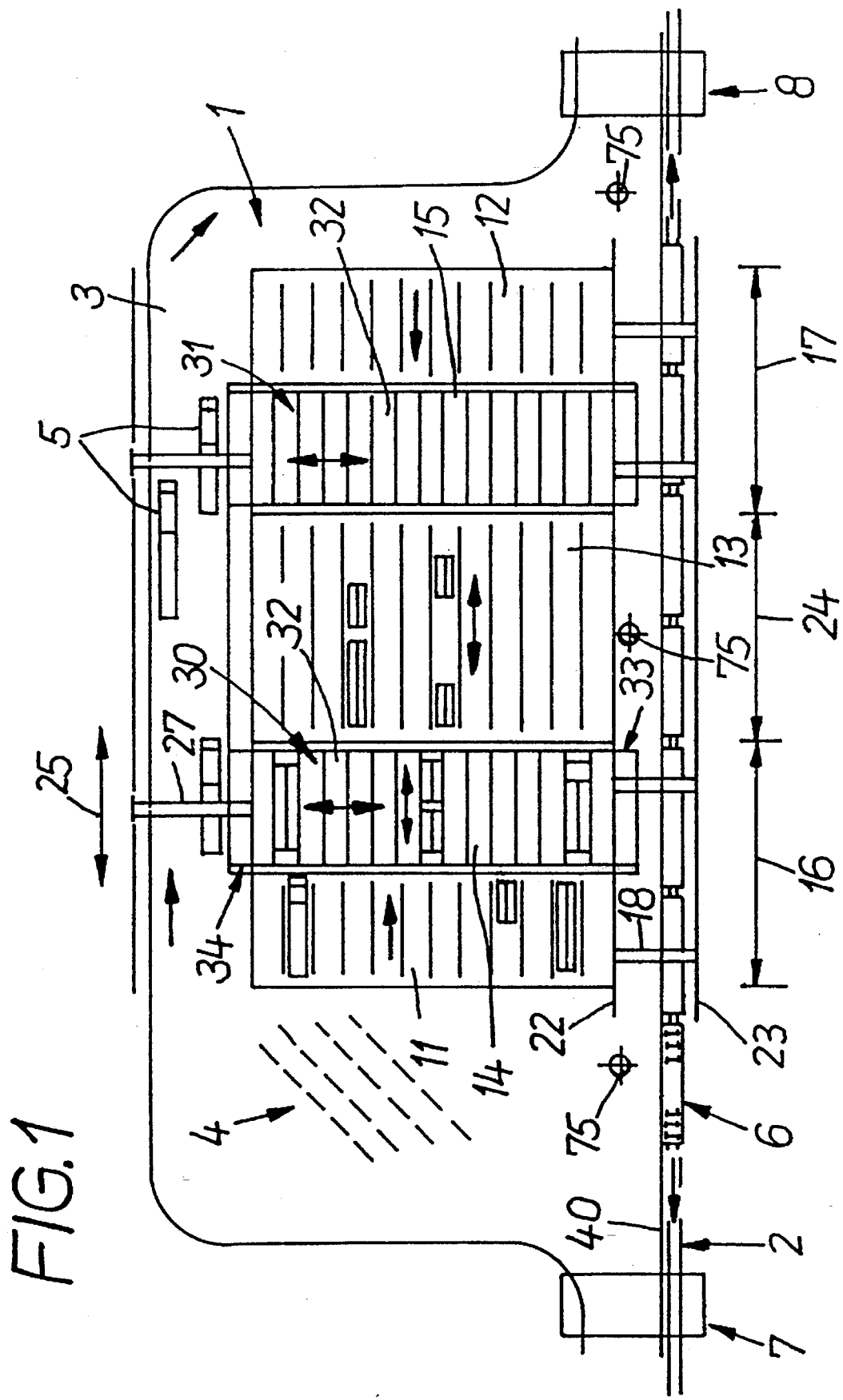
FIG. 1 shows a store including a transloading installation in a highly simplified plan view.

All in all the transloading installation comprises a store complex 1, a rail track 2 passing alongside thereof and a roadway 3 passing around the store complex 1 and optionally parking areas 4 for road vehicles 5. Viewed in the direction of the track, depending on the travelling direction of the train 6 to be loaded and/or unloaded—entry or exit stations 7, 8 (sometimes also referred to as entry or exit gates) are provided ahead of and following the store complex 1.

The store complex 1 comprises three mutually separated elevated shelf store units or regions, namely the two end portions or regions 11, 12 and the central portion or region 13, mutually separated in each case by a lane or by an operating space 14, 15. The region embracing the rail track 2, adjoining the store complex 1, essentially alongside the store portion 11 and the lane 14 and along the store portion 12 and the lane 15 each represents a railroad transloading region 16 or 17. Each railroad transloading section includes two transloading machines or transloading lifting means 18 adapted to travel on crane supporting rails 22, 23 extending parallel to the track 2.

In the region of the central store portion 13 which is not directly accessible to the outside, a car retooling zone 24, including the track 2 is provided. On that side of the store complex 1 which is opposite to the track 2 and in the region of each of the lanes 14, 15 a road transloading region 25, each comprising a transloading machine 27 for loading and unloading of road vehicles 5 is provided.

In the region of the lanes 14, 15 transverse conveyors 30, 31 are provided. These comprise individual transport units or pallets 32 which are self-propelled and are mobile in two planes in both directions. At least in the uppermost plane they are so closely fitting as to form a continuous "floor". At both ends of the transverse conveyors 30, 31 and outside of the actual store complex 1, lifting installations 33 (coveting the rail track 2) and 34 (coveting the road transloading region 25) are provided so that the mobile transport units 32 can be raised or lowered from one plane to another. When unloading a train for receiving or transferring a loaded goods unit by the transloading lifting means 18, the transport unit 32 in the lifting installations 33 will be maintained in or raised to the upper level. The transport unit 32 of the transverse conveyors 30, 31 will move during train unloading and/or road vehicle loading in the uppermost plane away from the rail 2 and during train loading and/or road vehicle unloading towards the raft 2 (cf the double arrows in the direction of the shelf lanes 14, 15).

Figure 2:
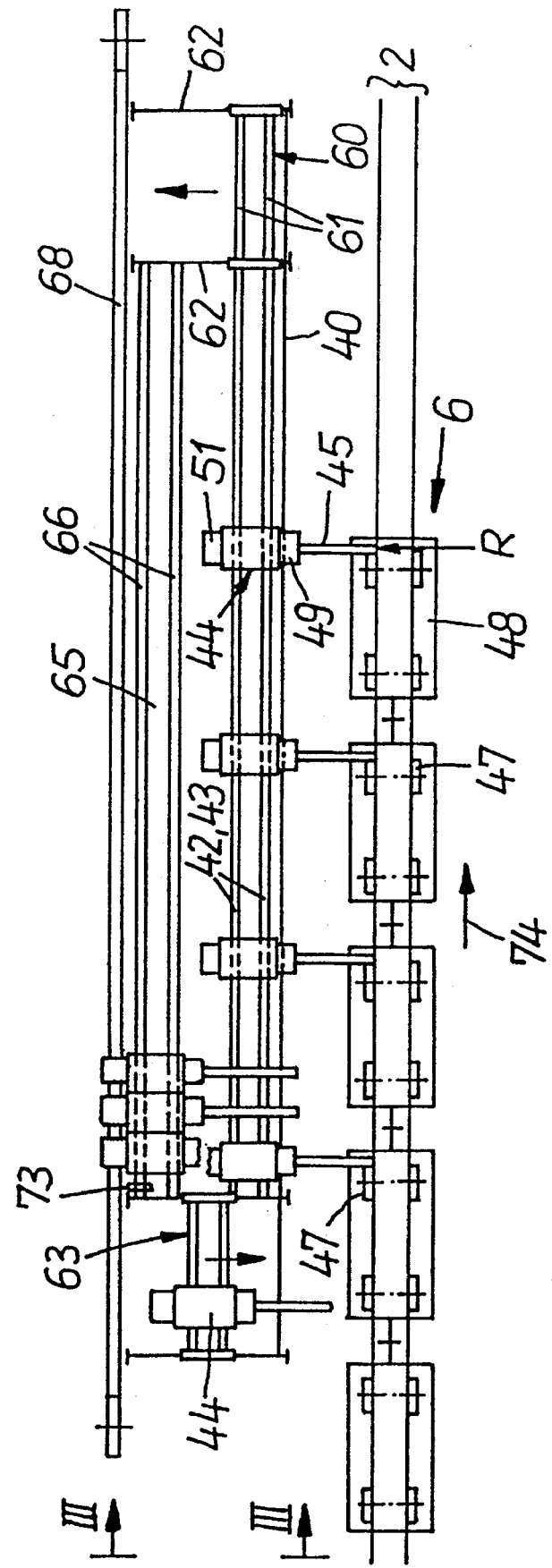
FIG. 2 shows the measuring section including the measuring units and a train formed by container wagons in a schematic plan view.
Figure 9:
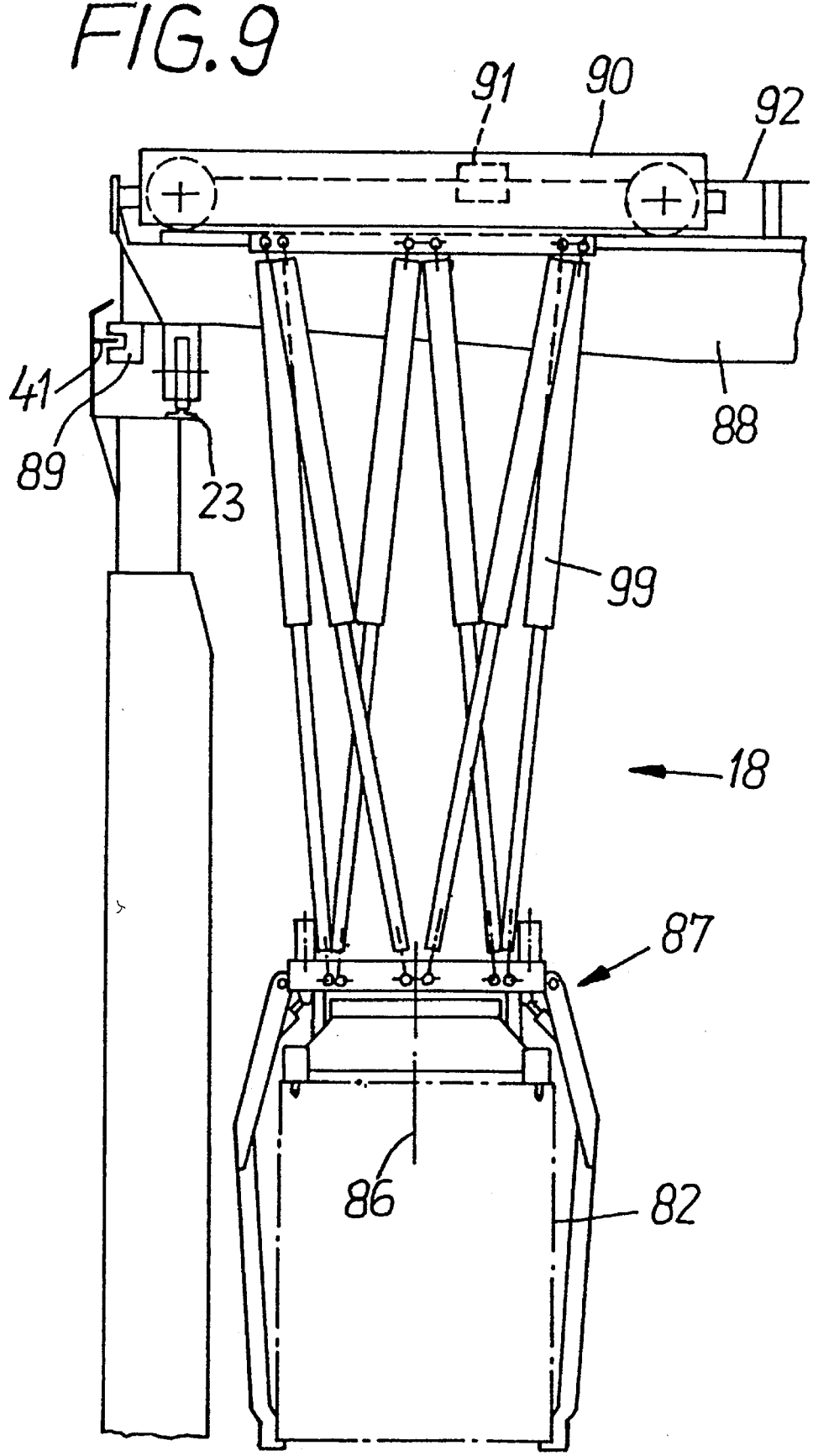
FIG. 9 shows a transloading lifting gear in an elevation in the longitudinal direction of the rails.

Above the transverse conveyors 30, 31 a lift structure in which a guide frame can be raised and lowered, can be moved in each of the lanes 14, 15. A so-called channel vehicle which serves to grip the loaded goods units to be transloaded by means of a gripping frame (spreader) and to take them into the individual boxes of the store portion 11 or 13, or 12 or 13, is suspended from the guide frame. Parallel to the rail track 2 a measuring rail 40 is provided which extends essentially from the station 7 to the station 8 and represents a fixed distance measure of a measuring section operating in absolute terms (FIGS. 1 to 3). Likewise parallel but extending only over the length of the store complex 1 a further measuring rail 41 is provided for the transloading lifting means 18 (FIG. 9). Both measuring rails 40, 4 1 are calibrated to match one another.

Parallel to the measuring rail 40 a guide-way 43 formed by two guide rails 42 is provided on which the measuring units or measuring carriages 44 are movably guided. The measuring carriages 44 are equipped with a dog jib 45 at the end of which a dog member 46 is provided. This dog member, which is e.g. designed as a roll, extends into the region of the wheels 47 of the transport or container cars 48 forming the train and outside the remainder of the vehicle profile. The measuring carriages 44, on that side which faces the measuring rail 40, are equipped with a measuring or reading sensor 49 and at the opposite side with a dog member 51. The measuring sensor 49 comprises a slot 52 by means of which it embraces the measuring rail 40. The measuring carriage 44 is designed to read off its prevailing position on the measuring rail 40 and to transmit the reading by way of a suitable data transmission system to a central computer. Accordingly the measuring carriages 44 jointly with the measuring rail 40 constitute a distance measuring system operating in absolute terms.

Figure 6:
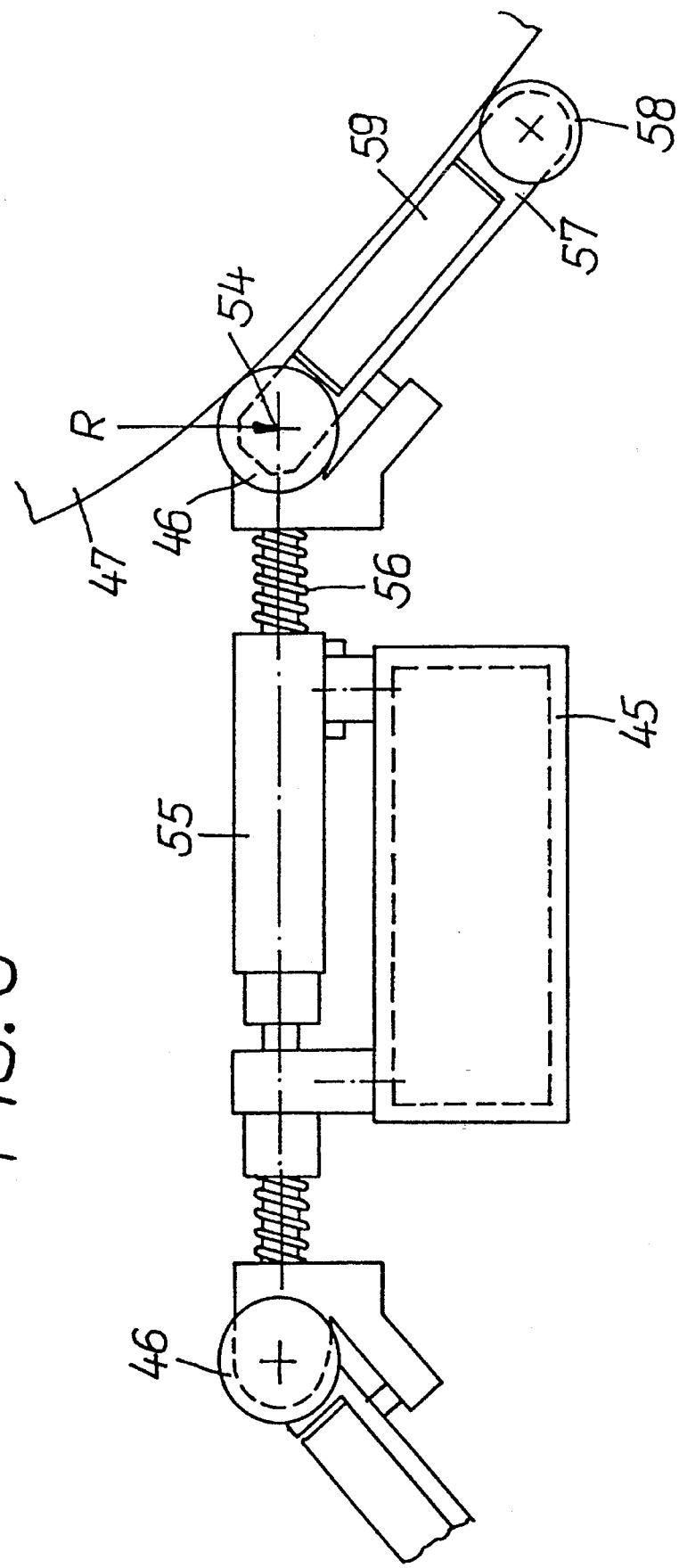
FIG. 6 shows a means for causing a container wagon, to drag along the measuring units in elevation.

Whenever a measuring carriage 44 is aligned with the guide way 43 (cf FIG. 3) the roll 46 extends into the wheel profile—within the region of the running surface (FIG. 3) or the wheel flange (FIG. 10)—and is engaged by the first wheel 47 of an approaching container car 48, and the measuring carriage 44 is thereby carded along by the container carriage 48 acting by way of the jib 45. The center point or the axis 54 of the roll 46 represents for the respective container car 48—viewed sideways—a reference measuring or reference point R (FIG. 6) which in relation to the container car 48 does not change in the direction of the track 2 and the measuring rail 40 (x-direction) and in any given time travels by the same distance as the latter.

In order to avoid damage to the rolls 46 and excessive loading of the jib 45, the roll is fitted to the jib 45 by means of a shock absorber 55, a compression spring 56 serving to rapidly restore the set or reference position of the roll 46 in relation to the jib 45. In order to prevent the roll 46 in the event of a deceleration of the wagon 48 from disengaging the wheel 47 and the reference point R being lost, a lever or frame 57 which is pivotable about the axis 54 is provided which at its opposite end is provided with a further support roll 58 and in its center with a magnet 59. The pivotable arrangement of the lever 57 and the magnet 59 permits a reliable coupling of the measuring carriage 44 to wheels 47 of different diameters.

The measuring carriages 44 are designed for measuring in both directions of travel. The dog member on the jib 45 therefore has a substantially symmetrical construction on both sides.

The guide-way 43 extends essentially over the entire length of the measuring rail 40 and thus between respective entries of the stations 7 and 8. In the region of the station 8 a converter or traverser 60 is provided, having guide rails 61 corresponding to the guide rail 42. The traverser 60 can be moved on two guide rails 62 extending transversely to the rail track 2. A corresponding traverser (converter) 63 is provided at the start of the measuring rail in the vicinity of the station 7. Parallel to the guide-way 43 a further guide-way 65 composed of corresponding guide rails 66 is provided on that side which is opposite to track 2. Immediately behind the guide-way 65, more particularly on the side of the dog member 51 Of the measuring carriage 44, an endless belt 68 extending parallel thereto is provided which is equipped with members 69 of magnetizable material. The endless belt 68 passes around two rollers 70, 71 and can be driven in both directions. Magnets 72 are provided underneath the dog members 51 of the measuring carriage 44. These, in relation to the member 69 exercise a force by which the measuring carriages 44 can be driven respectively moved by the endless belt 68 along the guide-way 65.

The entire installation for the continuous measuring of the position of the reference point R of the container car 48, as it changes in time—including the measuring rails 40, measuring carriage 44, guide-ways 43, 65, traversers 60, 63 and return transport means 68—may either be accommodated (as illustrated in FIG. 3) laterally adjoining the track 2 to be serviced or inside the latter, i.e. between the two rails of the track.

During the passage of the train 6 composed of the transport or container cars 48 at slow (crawling) speed through the entrance station 7 or 8 any gap between the container cars 48 will be recognised by means of a (not illustrated) rail switch with reference to the wheel succession and each container car 48 to be unloaded and/or loaded will have assigned thereto a measuring carriage 44. For this purpose the respective measuring carriage 44 is moved on the traverser 63 which is movable, e.g. by (not illustrated) hydraulic cylinders, to the measuring rail 40 and the roll 46 into engagement with the wheels 47 of the container car. The measuring carriage 44 will be carried along as described by the wheel 47 of the container car 48 in the direction of the railway transloading section 16 (cf the arrow 74 in FIG. 2). In this manner a reference point R is provided for each car 48, the absolute position in the longitudinal direction (x-direction) of which as a function of time is continuously measured by the sensor head 49 of the respective measuring carriage 44. At the end of the guide-way 43 the measuring carriage 44 travels onto the traverser 60. Immediately thereafter the traverser 60 is moved away from the track 2 in the direction of the guide-way 65. The measurement of the reference point R is thus deactivated.

Once the guide rails 61 of the traverser 60 have entered into alignment with the guide rails 66 of the guide-way 65, the measuring carriage is moved over as described from the endless belt 68 in the direction of the traverser 63. Immediately preceding the traverser 63 a stop means 73 is installed which only permits the passage of a measuring carriage 44 once the traverser 63, with its guide rails, is in alignment with the guide rails 66 of the guide-way 63.

The measuring carriage 44 on the traverser 63 is once again introduced into engagement with the profile of the wheels 47 if a gap between two container cars 48 is detected.

Figure 7:
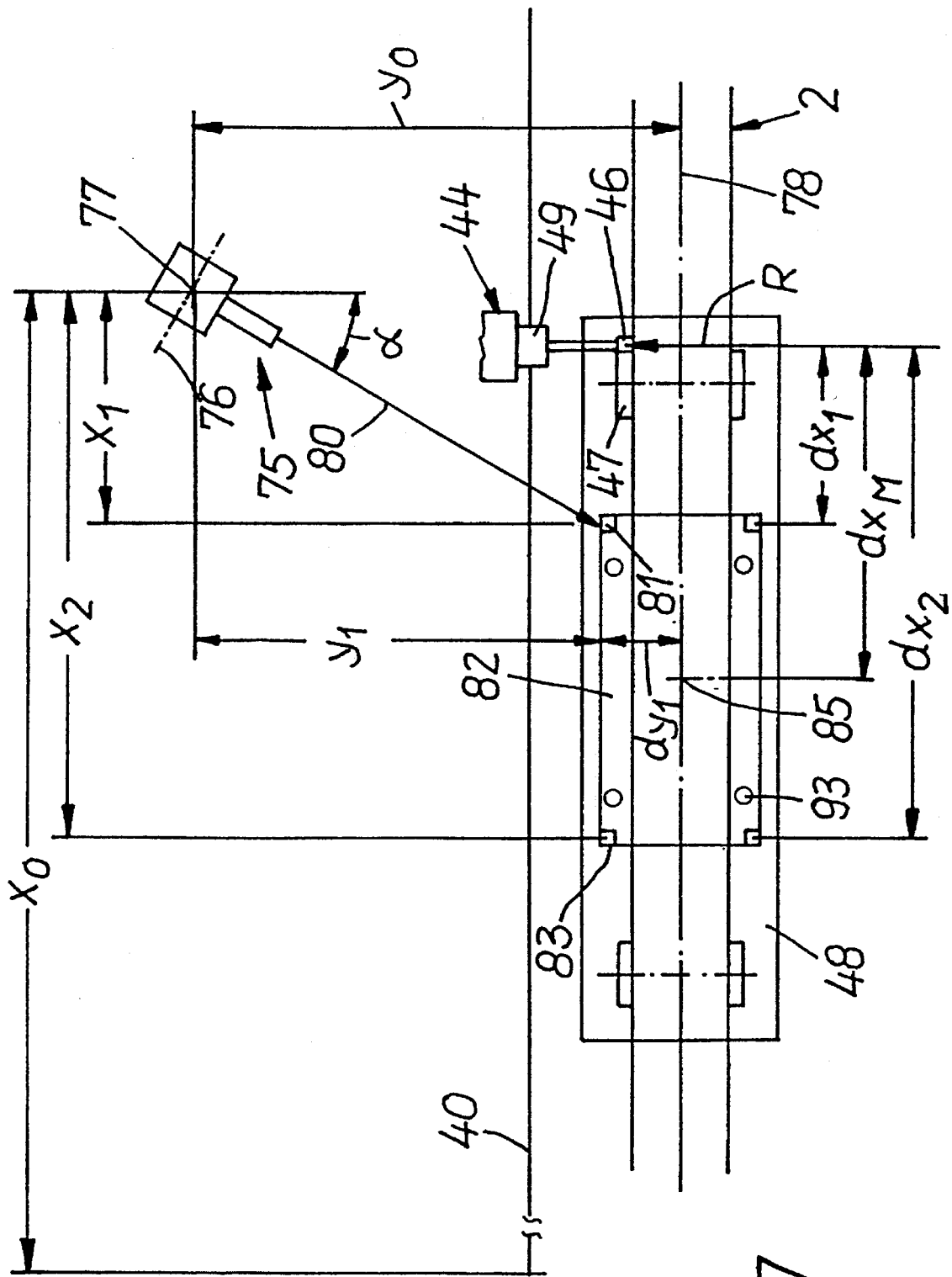
FIG. 7 shows a measuring means for determining the load attack points of the carrying units in plan view.
Figure 8:
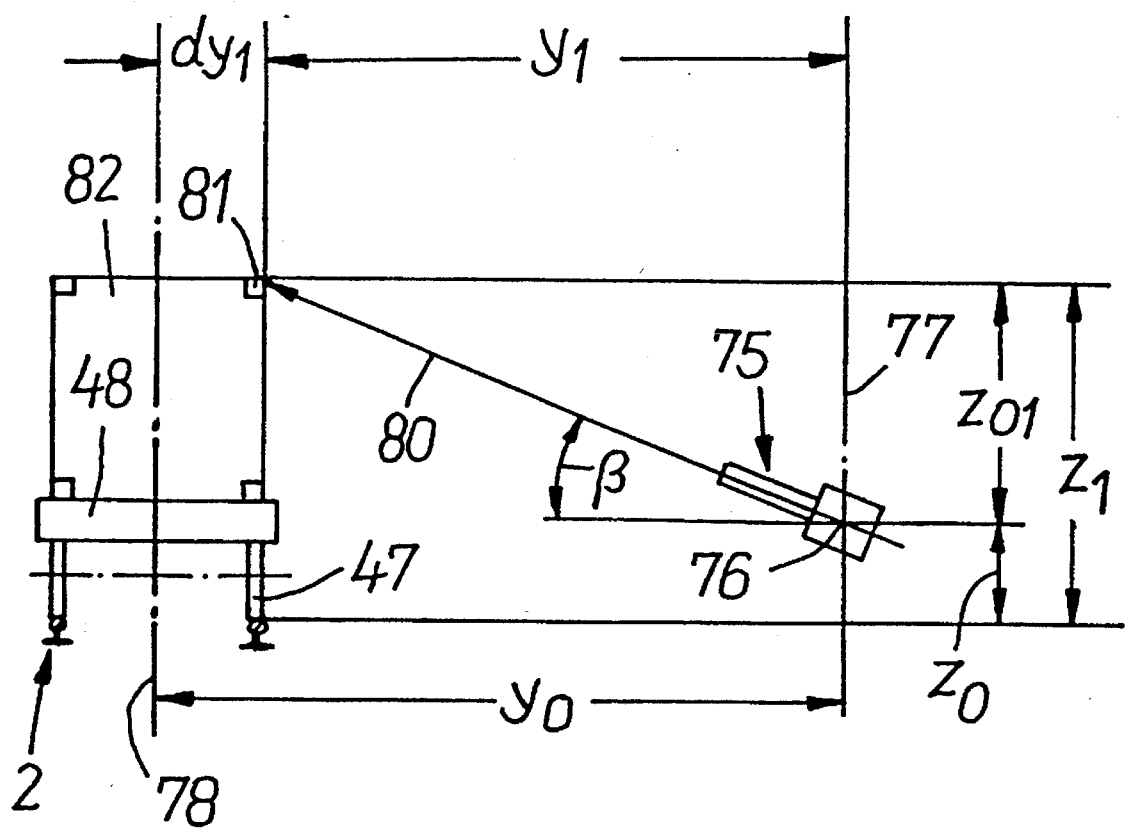
FIG. 8 shows the measuring means according to FIG. 7 in an elevation normal to the plane passing through the vertical pivoting axis 77 of the measuring means and the corner recess 81 of the container 82 sighted by the laser ray and—immediately following thereon—in a vertical section through the container.

Commercially available laser distance sensors 75 are provided between the stations 7 and 8 and the railway transloading regions 16 or 17 and also in the retooling region 24, (FIGS. 1, 7 and 8). These sensors are mounted on a positioning bracket which is pivotal about a vertical axis 77 and are pivotable about a horizontal axis 76 and equipped with integrated angle sensors. In this context the horizontal axis 76 is pivotable about the vertical axis 77. The emitted laser ray 80 may, for example, be guided at will three-dimensionally within a certain range, e.g. by means of a not illustrated control lever (joy stick). The vertical axis 77 is at a defined distance $y_0$ to the vertical plane 78 through the center of the track 2 and a defined distance $x_0$ to the zero point of the measuring rail 40 in the longitudinal direction of the rails. In FIG. 7 a laser ray 80 is shown directed onto a corner connection (corner casting) 81 of a container 82 positioned on a container car 48. The aiming of the laser ray 80 onto the desired position may be carried out and monitored by an operator by means of the control lever. Due to the simultaneous momentary measurement of the horizontal angle α, the vertical angle β and the distance of the laser ray 80 the longitudinal and transverse co-ordinates $x_1$ and $y_1$ of the corner connection 81 in relation to the vertical axis 77 of the sensor 75 are obtained at the instant of measurement. At the same instant, by the continuous measurement, the position of the reference point R in the longitudinal direction (x-direction) is likewise made known by the measuring carriage 44, so that the relative distance $dx_1$ which does not change with time, between the reference point R and the corner connection 81 (FIG. 7) can be determined in the longitudinal direction relative to the rails. In the same manner the corner recess 83 can be measured and its relative distance $dx_2$ in relation to the reference point R be determined. From these data the relative distance $dx_M$ of the common center 85 of the corner recesses 81, 83, . . . of the container 82 in relation to the reference point R can be determined. In addition, the distances of the corner recesses 81 respectively 83 and their common center 85 from the central plane 78 can likewise be determined from the abovementioned three measurements.

By means of the data so determined the transloading machine 18 can be applied with the center 86 of its gripping frame 87 accurately onto the—slowly moving —transported goods units 82, provided the gripping frame has been correctly set (lengthwise for 20'-or 40' containers, etc.). For controlling the drive means of the transloading lifting apparatus 18, a measuring rail 41 is provided in the railway transloading regions 16, 17 parallel to the carrier rail 23 and is associated with a measuring sensor 89 fitted to the crane girder 88.

The crane trolleys 90 are equipped with a matching measuring sensor 91 and the crane girders with a corresponding measuring rail 92 transverse to the direction of the rail track 2.

The gripping frame (spreader) 87 is adapted to be raised and lowered as well as positionally adjusted in the longitudinal and transverse direction of the rail track by way of six inclined hydraulic cylinders 99 about all three dimensional axes. The advantage of this construction of the transloading lifting machine 18 resides in that the position of the gripping frame 87 is defined at all times and does not escape control due to pendulum movements. Any inclined positioning of the loaded goods units 82 on the carder frame 47—as may have been detected by the preceding measurement—can be substantially compensated for by the varied operation of the individual hydraulic cylinders.

Once the gripping frame 87 lies on the container 82 and is locked therewith the container can be lifted off. In that context the transloading lifting machine 18 travels synchronously with the container car 48 until the container has been lifted out of the confining outline. After having been lifted off and having left the confining outlines of the train the container is centered by the transloading lifting apparatus 18, i.e. any transverse positional discrepancies and angular discrepancies are eliminated.

The transloading lifting apparatus 18 will then lower the container 82 at a defined position onto the transport unit 32 in the lifting device 34. This position can be readily retrieved without further measurement by the shelf operating apparatus and the roadway transloading apparatus 27 even after further movement of the transport unit 32.

After the unloading of the loaded goods unit 82 the container car 48 will be retooled if thereafter a loaded goods unit of a different kind, e.g. a 40' container instead of a 20' container is to be loaded on. For that purpose the no longer required carrier or locating pins, denoted in FIG. 7 by 93, are folded away and the newly required carrier pins on the container car 48 are swung in place. In order to ensure that the positioning of the refitted carrier pins coincides with the loaded goods units to be newly loaded, the positioning of the pins 93 is measured—once again in relation to the reference point R of the container car 48—this time by the laser distance sensor 75 in the retooling zone 24, and is compared with the corresponding preset measurements. Once the container car 48 has arrived at the end of the measuring rail 40 the measuring carriage 44 is withdrawn out of engagement with the container wagon 48 by the appropriate traverser or slide 60 or 63, returned to the opposite end of the measuring rail by the endless belt 68 and once again set up for reintroduction onto the measuring section by the other slide 63 or 60.

In the measuring carriage 44' illustrated in FIG. 10 the rolls 46' and 58' are fitted as dog members in the region of the wheel flange 94 of the wheel 47 of a container car 48. The jib 45' comprises a laser distance sensor 95 serving as distance measuring instrument, the optical axis 96 of which—with the rolls 46', 58' in contact against the wheel flange 94—being directed onto the inner periphery 97 of the wheel flange 98 of the wheel 47 in the immediate vicinity of the reference point R. Following contacting of the rolls 46', 58' with the wheel flange the distance between the inner periphery 97 of the wheel flange 98 and the laser distance sensor 95 or that of the guide path 43 associated with the measuring rail 40 prevailing at any one time and thereby also its distance $Y_{97/78}$ in relation to the mid-perpendicular 78 through the rail track 2, are measured continuously.

Due to the above described individual measurement of the transverse coordinates $y_1$ of the closest corner recess 81 or the positioning pin 93 in relation to the horizontal pivoting axis 77 of the distance sensor 75 at a point in time within the continuous measurement one obtains by way of the fixed parameters $Y_0$ (distance of the horizontal axis 77 from the central vertical 78) the distance $d_{y1}$ of the corner recess 81 or the locating pin 93 in relation to the central vertical 78 at that instant.

By a comparison of the $d_{y1}$ value and the distance $Y_{97/78}$ of the inner periphery 97 of the wheel 47 from the mid-perpendicular 78 determined at the same time by continuous measurement in real time, there is obtained during the subsequent continuous measurement, the transverse component of the corner recess 81 or the positioning pin 93 which changes with time, in relation to the mid-perpendicular 78. By taking into account a further corner recess 83 or a further positioning pin 93 the transverse component of the center 85 of the loaded goods traits 82—once again in relation to the mid-perpendicular 78—(which ideally amounts to zero) can be determined at any given time. By virtue of the measurements so obtained the center 86 of the transloading lifting machine 18 can be moved accurately over the center 85 of the loaded goods units 82 and the picking up of the loaded goods units 82 can thus be accelerated.

For measuring the loaded goods unit and container car it is possible to employ a laser scanner instead of the laser-light beam and distance sensor in order to permit fully automatic operation.

We claim:

1. A process for transloading goods units which comprises the steps of:

(a) assigning a reference point to each of a series of railway cars displaced as a train along a track by engaging with each of said cars a measurement carriage at an upstream location along said track and withdrawing said measurement carriages from engagement with said cars at a downstream location along said track;

(b) detecting load attack points of a goods unit on one of said cars and determining differential distances of said load attack points from a respective reference point of said one of said cars;

(c) automatically determining from said differential distances on said one of said cars a location of a common load attack center thereof with respect to said reference point of said one of said cars;

(d) detecting locating elements of another of said cars and determining differential distances of said locating elements from a respective reference point of said other of said cars;

(e) automatically determining from said differential distances on said other of said cars a location of a locating-element center thereof with respect to said reference point of said other of said cars;

(f) measuring positions of said reference points along said track; and (g) for unloading said goods unit from said one of said cars displacing a transloading lifting gear while continuously measuring a position of a load receiving center thereof until said load receiving center coincides with said load attack center and then engaging said lifting gear with said goods unit of said one of said cars and lifting said goods unit from said one of said cars, and, for loading a goods unit on said other of said cars, displacing a transloading lifting gear carrying a goods unit to be loaded on said other of said cars until said transloading lifting gear carrying said goods unit to be loaded has a center coinciding with said locating-element center and lowering said goods unit onto said other car for engagement by the locating elements thereof.

2. The process defined in claim 1 wherein step (a) includes a step of continuously measuring the absolute position of the reference point as a function of time by a sensor head of the respective measurement carriage.

3. The process defined in claim 1 wherein the step (b) includes the steps of ($b_1$) mounting at least one laser distance sensor pivotable about respective vertical and horizontal axes and spaced at predetermined vertical and horizontal distances from the center of the track between said upstream and downstream locations;

($b_2$) emitting a laser ray and directing said ray at a front corner of the respective car;

($b_3$) measuring simultaneously horizontal and vertical angles at which said ray extends toward said front corner of the car with respect to the vertical axis and a distance between said sensor and said corner and defining said absolute position of the reference point, determining thereby data including a relative distance between said front corner and said reference point along the track and relative distance between front and rear corners of the car as well as a half distance between said corners for controlling said transloading lifting gear.

* * * * *